US 9,766,266 B2

(12) United States Patent
Sadeghian Marnani et al.

(10) Patent No.: US 9,766,266 B2
(45) Date of Patent: Sep. 19, 2017

(54) METHOD OF ADVANCING A PROBE TIP OF A SCANNING MICROSCOPY DEVICE TOWARDS A SAMPLE SURFACE, AND DEVICE THEREFORE

(71) Applicant: Nederlandse Organisatie voor toegepast-natuurwetenschappelijk onderzoek TNO, 's-Gravenhage (NL)

(72) Inventors: Hamed Sadeghian Marnani, 's-Gravenhage (NL); Geerten Frans Ijsbrand Kramer, 's-Gravenhage (NL); Teunis Cornelis van den Dool, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/306,742

(22) PCT Filed: Apr. 28, 2015

(86) PCT No.: PCT/NL2015/050281
§ 371 (c)(1),
(2) Date: Oct. 25, 2016

(87) PCT Pub. No.: WO2015/167326
PCT Pub. Date: Nov. 5, 2015

(65) Prior Publication Data
US 2017/0052209 A1 Feb. 23, 2017

(30) Foreign Application Priority Data
Apr. 28, 2014 (EP) .................................. 14166220

(51) Int. Cl.
*G01Q 20/00* (2010.01)
*G01Q 10/00* (2010.01)
(Continued)

(52) U.S. Cl.
CPC .............. *G01Q 10/06* (2013.01); *B82Y 35/00* (2013.01)

(58) Field of Classification Search
USPC ........ 250/306, 307, 526; 850/1–5, 7; 73/105
See application file for complete search history.

(56) References Cited

U.S. PATENT DOCUMENTS

| 5,874,726 | A * | 2/1999 | Haydon ................ B82Y 20/00 250/201.1 |
| 7,665,349 | B2 * | 2/2010 | Mininni ................ B82Y 35/00 73/105 |
| 2006/0230474 | A1 * | 10/2006 | Mininni ............... G01Q 10/065 248/346.01 |

FOREIGN PATENT DOCUMENTS

JP 2006-220599 8/2006

OTHER PUBLICATIONS

International Search Report dated Jul. 28, 2015 for Appln. No. PCT/NL2015/050281.
(Continued)

*Primary Examiner* — Bernard Souw
(74) *Attorney, Agent, or Firm* — Pillsbury Winthrop Shaw Pittman, LLP

(57) ABSTRACT

The invention is directed at a method of advancing a probe tip of a probe of a scanning microscopy device towards a sample surface. The scanning microscopy device comprises the probe for scanning the sample surface for mapping nanostructures on the sample surface. The probe tip of the probe is mounted on a cantilever arranged for bringing the probe tip in contact with the sample surface. The method comprises controlling, by a controller, an actuator system of the device for moving the probe to the sample surface, and receiving, by the controller, a sensor signal indicative of at least one operational parameter of the probe for providing feedback to perform said controlling. The method further
(Continued)

comprises maintaining, during said controlling, an electric field between the sample surface and the probe tip, and evaluating the sensor signal indicative of the at least one operational parameter for determining an influence on said probe by said electric field, for determining proximity of the sample surface relative to the probe tip. The invention is further directed at a scanning microscopy device comprising a probe for scanning a sample surface for mapping nanostructures thereon.

20 Claims, 4 Drawing Sheets

(51) Int. Cl.
    *G01Q 60/24*     (2010.01)
    *G01Q 10/06*     (2010.01)
    *B82Y 35/00*     (2011.01)

(56) References Cited

OTHER PUBLICATIONS

Leili Cheng et al.; "A method of tip-sample distance control based on electrostatic force in maskless microplasma scanning etching"; 2011 International Conference on Electronics and Optoelectronics, Jul. 29, 2011, pp. V4-292-V4-295.

Soma Biswas et al., "Tuning the instability in static mode atomic force spectroscopy as obtained in an AFM by applying an electric field between the tip and the substrate", Ultramicroscopy, vol. 122, Nov. 1, 2012, pp. 19-25.

Patel et al., "Constant Tip-Surface Distance with Atomic Force Microscopy via Quality Factor Feedback", ASPE's $28^{th}$ Annual Meeting of ASPE, Oct. 20-25, 2013, pp. 1-2.

* cited by examiner

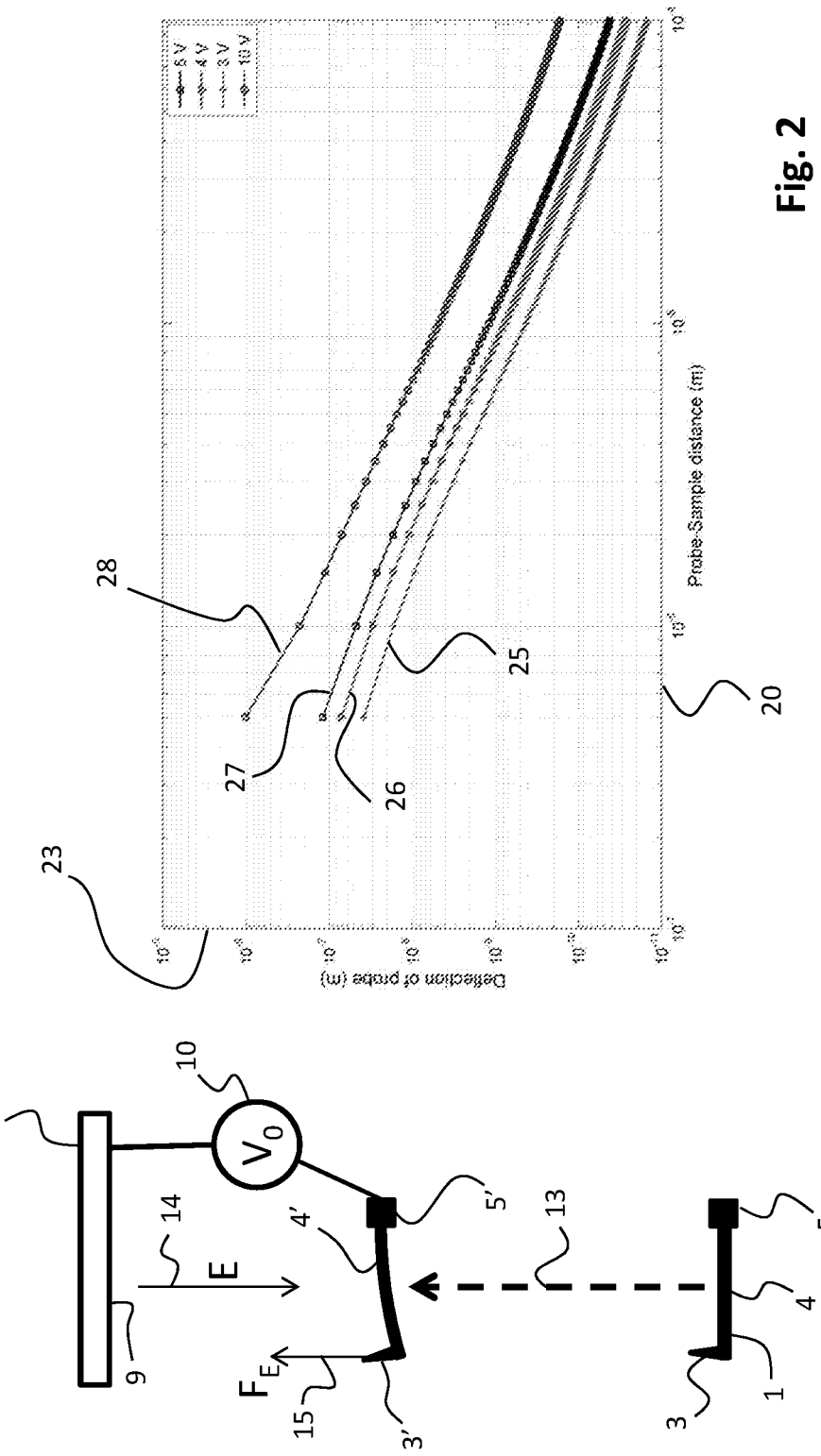

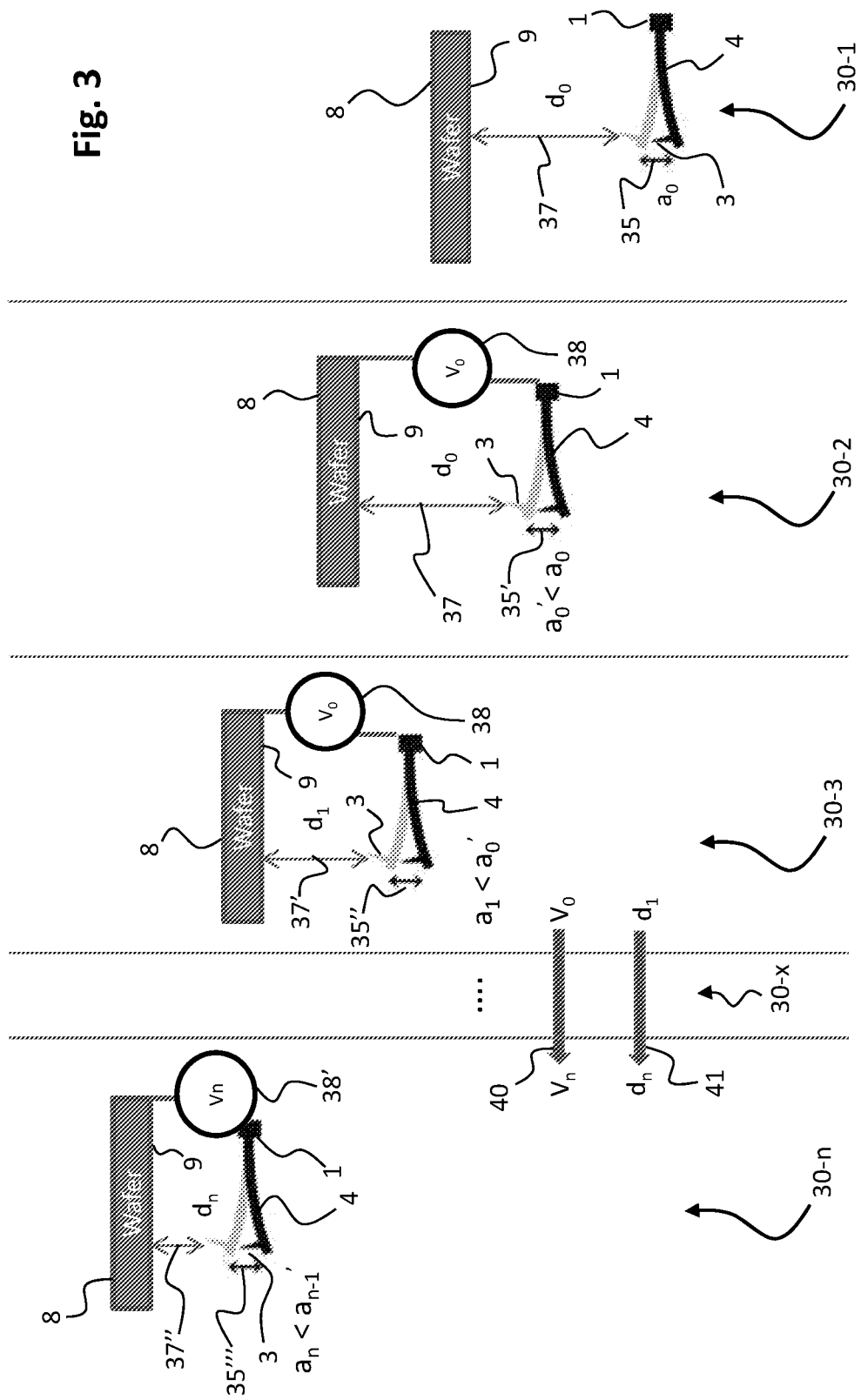

METHOD OF ADVANCING A PROBE TIP OF A SCANNING MICROSCOPY DEVICE TOWARDS A SAMPLE SURFACE, AND DEVICE THEREFORE

CROSS-REFERENCE TO RELATED APPLICATIONS

This is the U.S. National Stage of PCT/NL2015/050281, filed Apr. 28, 2015, which in turn claims priority to European Application No. 14166220.5, filed Apr. 28, 2014, the entire contents of both applications being incorporated herein by reference in their entireties.

FIELD OF THE INVENTION

The present invention is directed at a method of advancing a probe tip of a probe of a scanning microscopy device towards a sample surface, the device comprising the probe for scanning the sample surface for mapping nanostructures on the sample surface, wherein the probe tip of the probe is mounted on a cantilever arranged for bringing the probe tip in contact with the sample surface, the method comprising controlling, by a controller, an actuator system of the device for moving the probe to the sample surface, and receiving, by the controller, a sensor signal indicative of at least one operational parameter of the probe for providing feedback to perform said controlling.

The invention is further directed at a scanning microscopy device for mapping nanostructures on a sample surface of a sample; the device being arranged for performing a method as defined above.

BACKGROUND

Scanning microscopy, such as scanning probe microscopy (SPM), e.g. atomic force microscopy (AFM), is known as an accurate and promising high resolution surface microscopy technique. This technology is for example applied in the semiconductor industry for mapping semiconductor topologies, particle and defect inspection and review and metrology. Other uses of this technology are found in biomedical industry, nanotechnology, and scientific applications. In particular, AFM may be used for critical dimension metrology (CD-metrology), particle and defect scanning, stress- and roughness measurements. AFM microscopy allows visualization of surfaces at very high accuracy, enabling visualization of surface elements at sub-nanometer resolution.

Scanning probe microscopy is usually performed by tracing of a sample surface in a scanning motion using a probe tip touching or tapping (i.e. repeatedly touching) the surface, while accurately measuring disposition of the probe tip in a direction transverse to the sample surface (z-direction) using for example a high precision optical sensing system, e.g. using beam deflection or an interferometer. Scanning is performed by vibrating the tip in the z-direction, while performing the scanning motion across the sample surface to be mapped. To map the sample surface, every fraction of a section of the sample surface with sub-nanometer dimensions is touched or tapped by the probe tip at least once, providing a highly accurate surface map.

Before scanning of the substrate surface may commence, the probe tip of the probe has to approach the sample surface sufficiently close to be able to perform the above tapping sequence. This may for example be achieved by an actuator system comprising a stepper motor. Such a stepper motor may typically have a dynamic range in the order of one or a few millimeters, and a sub-micron stepped increment resolution. The actuator system may move the probe accurately enough to approach the probe tip within operational distance for performing the scanning. However, the approach must be controlled such that the probe tip does not overshoot and crash into the surface, as this may break the probe and damage the surface.

In analogy, the challenge in controlling the approach method may be compared with controlling a mission to fly to the moon in 60 seconds and stop 38 meter from its surface without overshooting and crashing. Conventional methods often rely on repeated increments that are subsequently followed by operation of the scanner to sense whether the surface is near. This walk-and-talk method is comparable to moving blindfolded towards an obstacle by subsequently taking a pace followed by feeling with a hand whether the obstacle is nearby. As will be appreciated, this is a rather slow approach method that is not desired in, for example, an industrial environment wherein the throughput of surfaces to be mapped is relatively high.

SUMMARY OF THE INVENTION

It is an object of the present invention to provide an approach method for a scanning probe microscopy device, which approach method is accurately controlled, and may be performed sufficiently fast such as to decrease the processing time of mapping a sample surface.

To this end, there is provided herewith a method of advancing a probe tip of a probe of a scanning microscopy device towards a sample surface in accordance with claim 1. In the method of the present invention, the scanning microscopy device comprises the probe for scanning the sample surface for mapping nanostructures on the sample surface, wherein the probe tip of the probe is mounted on a cantilever arranged for bringing the probe tip in contact with the sample surface. The method comprising: controlling, by a controller, an actuator system of the device for moving the probe to the sample surface; receiving, by the controller, a sensor signal indicative of at least one operational parameter of the probe for providing feedback to perform said controlling; wherein the method further comprises: maintaining, during said controlling, an electric field between the sample surface and the probe tip; and evaluating the sensor signal indicative of the at least one operational parameter for determining an influence on said probe by said electric field, for determining proximity of the sample surface relative to the probe tip.

In accordance with the principles of the present invention, an electric field is applied between the sample surface and the probe tip while the probe is approaching the sample surface. The electric field may be applied using electrodes, or the sample surface may be charged directly (e.g. in case it is electrically conductive, or by applying surface charge carriers). As a result of the electric field, an electrostatic force is applied to the probe tip that will result in a static deflection thereof. The electrostatic force is dependent on the proximity of the probe tip near the surface. At large distance, the electric field may be too small to cause any significant deflection of the probe tip. However, as the probe tip is moving closer to the surface, the electrostatic force will increase and therefore the static deflection of the probe increases. The deflection of the probe tip can be measured with high accuracy by the scanning microscopy device. Therefore, by constantly monitoring probe deflection while the probe approaches the sample surface, the proximity of the probe tip near the sample surface may be accurately determined by evaluating the deflection. Alternatively, instead of or in addition to directly measuring the deflection of the probe under influence of the electrostatic force, other operational parameters may be measured from which an indication of the proximity of the sample surface relative to the probe tip may be determined. For example, the deflection of the probe tip may be determined using an optical sensor system, however it may also be possible to accurately determine strain on the probe using a strain gauge.

In accordance with the method of the present invention, a controller which controls the actuator system of the device for moving the probe towards the sample surface, receives a sensor signal which is indicative of at least one operational parameter of the probe (e.g. probe deflection). This sensor signal is used as input to the feedback system for performing the controlling. For example, the deflection of the probe may be evaluated for example against a calculated value of the expected deflection to establish the exact location of the probe relative to the sample surface. Using this method, the probe can be moved relatively fast to the sample surface and be stopped in time to prevent crashing of the probe tip into the surface.

An electric field may be obtained, in accordance with an embodiment of the present invention, by applying and maintaining a bias voltage difference $V_0$ between the sample surface and the probe tip. As will be appreciated, this may be achieved in different manners, for example by electrically charging the probe, or probe tip, or by electrically charging the sample surface, or both such that a voltage difference is obtained between a sample surface and a probe tip. Having knowledge of the voltage difference between the sample surface and the probe tip, the electrostatic force experienced by the probe tip may be calculated accurately. From this, the influence of the electric field on the operational parameter of the probe that can be obtained from the sensor signal can be calculated as well. For example, where the sensor signal includes a probe tip deflection signal indicative of a deflection w of the probe tip from a reference position $a_0$, the deflection of the probe tip can be calculated using knowledge of for example the bending stiffness of the probe as well as the geometrics of the probe design. For example the step of evaluating may in accordance with the embodiments of the invention comprises a comparison of the deflection w of the probe tip as obtained from the sensor signal with the calculated deflection $w_c$ in order to establish from the comparison the distance between the probe tip and the sample surface. For example, in accordance with a specific embodiment the calculated deflection $w_c$ may be obtained from solving or estimating the differential equation:

$$C\left(\frac{\partial^4 w}{\partial x^4}\right) = -\frac{V_0^2}{2(a_0 - w)^2}$$

In this equation, C is a constant which takes into account one or more properties of the probe. For example, the constant C could include the bending stiffness (EI) of the cantilever as well as the width b of the cantilever where the cantilever has a specific design (e.g. a regular shaped leaf spring which has a relatively large width as compared to its thickness or height dimension). Note that x is the coordinate along the length dimension of the beam. The differential equations needs to be solved for w, the deflection of the beam, which is a function of x. Therefore the amount of deflection at the probe tip (where the fixed end of the cantilever is at x=0) is obtained by substituting the length l of the cantilever for x in the end result after solving the differential equation. In the above case, for a given bending stiffness EI and width b of the cantilever, the constant $C=EI/b\epsilon_0$. Herein, $\epsilon_0$ is the permittivity of air. Removing C from the differential equation, the equation reads:

$$EI\left(\frac{\partial^4 w}{\partial x^4}\right) = -\frac{\epsilon_0 b V_0^2}{2(a_0 - w)^2}$$

In accordance with the method of the present invention, the step of evaluating of the sensor signal further comprising comparing the sensor signal with a reference value and controlling said actuator system dependent on said comparison. In accordance with this embodiment, the method may further comprise adjusting of an electric field strength of the electric field dependent on said step of evaluating while the probe tip advances the substrate surface. For example, the sensor signal may be compared with a reference value indicating a specific probe tip deflection or matching a certain magnitude of a resultant force applied on the probe or probe tip. In that case, the actuator system may be controlled such that the current applied force on the probe (or probe tip) will not exceed this preset force value, or such that it will stop advancing the probe upon reaching that point, or such that the current applied force is kept at the preset force value. The electric field strength of the electric field may be adjusted while the controller keeps the applied force constant by controlling the actuator system, resulting in the probe tip approaching the sample surface. The electric field strength in accordance with this embodiment may for example be decreased, such that the same preset force value will be experienced by the probe at a point closer to the substrate surface. Adjusting the electric field strength may, in those embodiments wherein a bias voltage is applied between the sample surface and the probe tip, be obtained by adjusting this bias voltage $V_0$. Instead of following a stepwise process, adjustment can be performed continuously to advance the probe while keeping the applied force on the probe as good as possible at the preset level.

Although using the above principles and differential equation, the deflection of the probe tip may be precisely calculated, allowing accurate control of the approach of the probe tip to the sample surface to prevent damage, further accuracy of the method is obtained by the embodiment described below. According to this embodiment, the step of controlling further comprises controlling, by the controller during said moving of the probe, the actuator system for applying an oscillator motion to the probe tip such as to oscillate the probe tip in a direction transverse to the sample surface; and wherein the sensor signal is at least indicative of a parameter of said oscillator motion. The method may in this embodiment for example be based on measuring dynamic deflection.

Similar as in the case of the static deflection of the probe tip described above, the present dynamic deflection based method of controlling the approach allows for a reliable and accurate determination of the proximity of the probe tip near the sample surface. However, since from the sensor signal the controller may obtain the real time amplitude signal of the amplitude of the probe tip, the processing of the signals is easier thereby providing a further improvement of the design.

The step of evaluating may, in accordance with an embodiment comprise the determining of the parameter of the oscillator motion from the sensor signal and comparing the determined parameter with a reference value (e.g. a value that would be expected without the presence of an electric field) for determining a deviation from the reference value. For example, the amplitude of the probe tip due to the oscillating motion may be compared with a reference amplitude that the probe tip would be expected to have in case no electric fields were present between the sample surface and the probe tip. The deviation from this reference value will be an indication of the strength of the electrostatic force experienced by the probe tip, and thereby of the proximity of the sample surface. Alternatively or additionally, the sensor signal may include any one of quality factor, damping, phase lag, phase, curvature measurement, interference, piezoresistivity, wavelength change of a ring resonator or waveguide integrated in the cantilever, or capacitive changes.

In a further embodiment of the invention, upon determining a deviation, the bias voltage may be reduced such as to diminish the deviation, and the steps of controlling the actuator system and receiving and evaluating the sensor signal may be repeated. This repetition may proceed until the bias voltage may be reduced to zero (or to any other desired value), from where a regular 'walk-end-talk' method (e.g. as described in the introductory part of this document) is applied for the final approach to the sample surface. After the approach of the probe tip to the sample surface is completed, the method may commence by scanning the sample surface for mapping the nanostructures, by applying any desired technique from there.

The present invention allows for a fast approach of the probe tip to the sample surface while reducing the risk of the probe tip crashing into the surface damaging both. As a result, the processing time of performing scanning probe microscopy using a scanning probe microscope on a sample surface, such as a waiver or any other surface, is considerably reduced. This further provides opportunities for applying scanning probe microscopy in industrial processes, which require a high throughput of samples to be examined.

The steps of the method may in accordance with some embodiments be performed simultaneously in a continuous manner. Alternatively, one or more steps may be performed sequentially, without departing from the inventive concept.

In accordance with a second aspect of the present invention there is provided a method of operating a scanning microscopy device for scanning of the sample surface for mapping of the nanostructures thereon, the method comprising a method of advancing a probe tip of a probe towards a sample surface in accordance with any of the previous claims.

In accordance with a third aspect of the present invention there is provided a scanning microscopy device for mapping nanostructures on a sample surface of a sample, comprising at least one probe for scanning the sample surface, and an actuator system for moving the probe to and from the sample for approaching the sample surface, wherein the probe comprises a probe tip mounted on a cantilever arranged for bringing the probe tip in contact with the sampling surface for enabling the scanning of the sample surface, the device further comprising a controller for controlling the actuator system of the device for moving the probe to the sample surface, said controller comprising input means communicatively connected to a sensor for receiving a sensor signal indicative of at least one operational parameter of the probe for providing feedback to perform said controlling and one or more electrodes for establishing and maintaining an electric field between the sample surface and the probe tip wherein the controller is further arranged for evaluating the sensor signal indicative of the at least one operational parameter for determining an influence on said probe by said electric field, for determining proximity of the sample surface relative to the probe tip.

In accordance with a fourth aspect of the present invention there is provided a computer program product, wherein said computer program product, when running on a scanning microscopy device comprising at least one probe for scanning the sample surface, and an actuator system for moving the probe to and from the sample for approaching the sample surface, wherein the probe comprises a probe tip mounted on a cantilever arranged for bringing the probe tip in contact with the sample surface for enabling the scanning of the sample surface, is capable of operating the scanning microscopy device for advancing the probe tip towards the sample surface in accordance with a method as defined hereinabove in accordance with the first or second aspect.

The scanning probe microscopy device and/or method of the present invention may for example be an atomic force microscopy (AFM) device or method. Although in the present document reference will be made to particularly the embodiment of an atomic force microscopy device, the teachings of this document are not restricted to such an application, and may be applied to similar devices in the field of: BEEM, ballistic electron emission microscopy; CFM, chemical force microscopy; C-AFM, conductive atomic force microscopy; ECSTM electrochemical scanning tunneling microscope; EFM, electrostatic force microscopy; FluidFM, fluidic force microscope; FMM, force modulation microscopy; FOSPM, feature-oriented scanning probe microscopy; KPFM, kelvin probe force microscopy; MFM, magnetic force microscopy; MRFM, magnetic resonance force microscopy; NSOM, near-field scanning optical microscopy (or SNOM, scanning near-field optical microscopy); PFM, Piezoresponse Force Microscopy; PSTM, photon scanning tunneling microscopy; PTMS, photothermal microspectroscopy/microscopy; SCM, scanning capacitance microscopy; SECM, scanning electrochemical microscopy; SGM, scanning gate microscopy; nanomechanical mapping, and force spectroscopy.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIG. 1 schematically illustrates a method of the present invention;

FIG. 2 is a graph of the calculated deflection of the probe tip and various bias voltages (electric field strength) in an embodiment of the present invention with static deflection;

FIG. 3 illustrates a further embodiment of the method of the present invention based on dynamic deflection;

DETAILED DESCRIPTION

Figure 4:
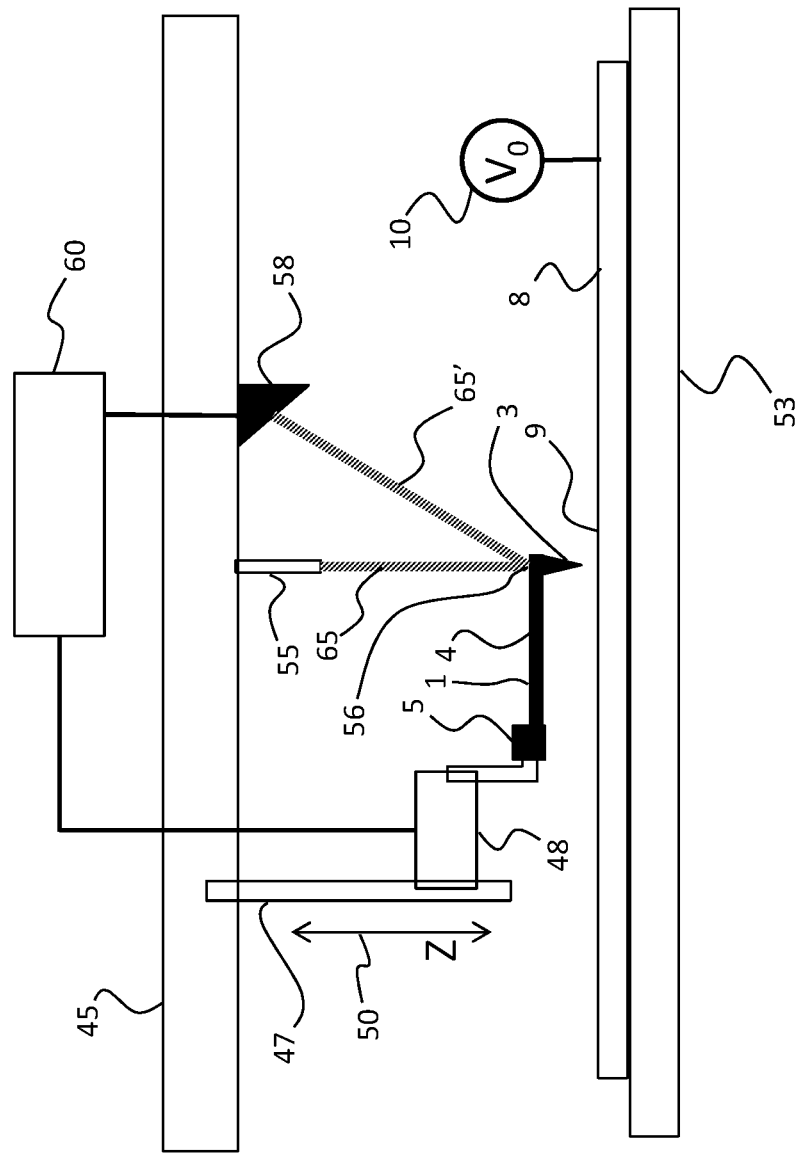
FIG. 4 illustrates a scanning probe microscope in accordance with a second aspect of the present invention.

FIG. 1 schematically illustrates a method of the invention which is based on static deflection of the probe tip 3 under influence of the electric field 14. In FIG. 1, a sample 8 having a sample surface 9 is schematically illustrated. The sample surface 9 is electrically charged by applying a voltage $V_0$ schematically illustrated with reference numeral 10.

A probe 1 comprising a cantilever 4 and a probe tip 3 and suspending from an actuator or actuator system with structure 5 is approached towards the sample surface 9. The structure 5 may include an oscillator stage or an oscillator actuator that allows for oscillating the probe tip 3 during scanning of the scanning probe microscope for mapping nano-structures on the sample surface 9. The oscillator stage is not illustrated in FIG. 1, and is not used during approach of the probe tip 3 to the sample surface 9 in the embodiment of FIG. 1 which is based on static deflection of the probe tip 3.

In FIG. 1, the probe 1 is approaching the sample surface 9 as is schematically illustrated by the dashed arrow 13. The probe 1' with suspension structure 5', cantilever 4' and probe tip 3', illustrates the same probe 1 at a later moment during the approach. In the initial position of the probe 1, the probe 1 is sufficiently remote from the sample surface 9 such as to experience only negligible influence of the electric field, for simplicity illustrated as the probe 1 having no deflection and experiencing no electrostatic force. At the later positions of the probe 1', the probe tip 3' experiences an electrostatic force FE schematically illustrated by arrow 15 pointing to the sample surface 9 indicating an attractive force. The electrostatic force 15 results from the presence of electric field 14 induced by applying a bias voltage $V_0$ 10 between the sample surface 9 and the probe tip 3'. Using the differential equation described earlier in this description, the amount of deflection of probe tip 3' at the given position can be calculated accurately. Since also the deflection of the probe tip 3' can be measured by the scanning probe microscope (the microscope is designed for retrieving this data accurately), the exact distance between the probe tip 3' and the sample surface 9 can be determined by the controller. The controller itself is not illustrated in FIG. 1 but will be described for example as element 60 in FIG. 4.

In FIG. 2, the calculated value for the deflection of the probe tip and various bias voltages is illustrated. In FIG. 2, the deflection of the probe is set out on logarithmic vertical axis 23. The probe sample distance is set out on horizontal logarithmic axis 20 of the graph. The probe deflection is illustrated for four different bias voltage levels between the probe and the sample surface. The line 25 indicates the probe tip deflection and the bias voltage of 3V. Lines 26, 27 and 28 respectively indicate said deflection of the probe tip for bias voltage levels of 4V, 5V, and 10V respectively. As follows from FIG. 2, by accurate determination of the deflection of the probe from the sensor signal, and knowledge of the bias voltage applied to the sample surface 9, the distance between the probe tip and the sample surface can be accurately determined. This allows for controlling the approach method such as to prevent crashing of the probe into the surface.

A further embodiment based on the dynamic deflection is illustrated in FIG. 3. FIG. 3 illustrates a number of subsequent steps 30-1, 30-2, 30-3, . . . , 30-x, . . . , and 30-n of the approach method. The method starts at step 30-1. For each step 30-1 . . . 30-n, FIG. 3 illustrates the probe 1 comprising the cantilever 4 and the probe tip 3. The cantilever 4 and the probe tip 3 are illustrated in two positions, suggesting the ultimate positions of the oscillator motion of the probe. Also the amplitude $a_0$ (35, 35', 35", 35''') is illustrated in these steps. FIG. 3 further illustrates the sample 8 having a sample surface 9, the voltage (38, 38') applied between the probe and the sample surface, as well as the distance $d_0$ (37, 37', 37") between the probe tip and the sample surface.

In the first step 30-1, the probe 1 is at a remote distance of the sample surface 9 and no bias voltage is applied yet. Without presence of any bias voltage, by applying an oscillator motion through an oscillator stage on the probe 1, the probe tip 3 describes an amplitude $a_0$ 35. The distance between the probe tip (and its closest position to the sample surface 9) and the sample surface is indicated by distance $d_0$ 37.

Then, in step 30-2, a voltage $V_0$ 38 is applied between the sample surface 9 and the probe 1. The voltage $V_0$ 38 may be a DC voltage or an AC voltage (the subscript '0' is used here to indicate that $V_0$ is the magnitude of the DC or AC voltage at the start of the method). The presence of the bias voltage creates an electric field which influences the oscillator motion of the probe 1 applied by the oscillator stage. The amplitude $a_0'$ indicated by reference numeral 35' will be smaller than the original amplitude $a_0$ that was experienced when no electric field was present. The reduced amplitude $a_0'$ can be accurately determined from the sensor signal by the scanning microscope. The distance of the probe tip 3 towards the sample surface 9 is still at $d_0$ 37. Moving the probe 1 closer to the sample surface 9 in step 30-3, the amplitude $a_1$ 35" will be further reduced as indicated in FIG. 3. The new distance between the probe tip 3 and the sample surface 9 is $d_1$ 37'. The bias voltage is still at voltage level $V_0$ 38.

In the subsequent steps (generally indicated as 30-x) the bias voltage will be stepwise reduced in each step such as to reset the amplitude for example to its original level $a_0'$ but at its new distance d to the sample surface. The steps of reducing the bias voltage and subsequently moving the probe closer to the sample surface 9 and thereafter evaluating the new situation and further reducing the sample surface will be conducted consecutively until the bias voltage $V_n$ 38' in step 30-n will be 0 Volt. The probe tip 1 is now at close distance to the sample surface 9 and the final approach to the sample surface may commence, for example using a regular conventional 'walk-end-talk' method.

In an alternative embodiment, the latter can be achieved in a continuous manner, without using subsequent steps of reducing the bias voltage and evaluating the new situation. In the alternative implementation, the above steps 30-1 and 30-2 are performed as described, and thereafter the approach method slightly deviates as follows. Thereafter, the control loop is closed on the approach actuator using the cantilever signal $a_0'$ as feedback signal and keeping it constant. So the controller continuously adjusts the approach actuator and/or the Z-stage to keep the cantilever deflection constant. As a result, when $V_0$ is kept constant, also the distance to the surface 37 is kept constant. However to approach the surface, $V_0$ is lowered continuously and smoothly, causing the controller to follow by approaching the surface to keep the defection signal $a_0$ constant. When the $V_0$ reaches 0 Volt, the tip approached the surface up to the point where a cantilever deflection $a_0'$ is maintained, and the scanning may be started immediately.

FIG. 4 illustrates a device in accordance with the present invention. In FIG. 4, a frame 45 comprises a lowering rail 47 across which a stepper motor 48 may lower the probe 1 towards the sample surface 9 of a sample 8. The probe 1 consists of the actuator stage implemented in its suspension structure 5, the cantilever 4 and a probe tip 3. The Z dimension is illustrated schematically with double arrow 50. Frame 45 further comprises a laser unit 55 that provides a laser beam 65 which impinges on the top 56 of the probe tip 3. At position 56 a mirror or specular reflective surface is present on the probe tip 3, which reflects the reflector beam 65' towards an optical sensor system 58 that allows to determine the exact position at which the reflected beam 65' impinges on the sensor 58. The sensor signal is provided to a control unit 60 which also controls operation of the stepper motor 48. A voltage can be applied to the sample surface 9 of sample 8 by charging the carrier surface 53 which comprises electrodes underneath the sample 8. To this end, the scanning probe microscope comprises a power supply 67. The scanning probe microscope illustrated in FIG. 4 may apply any of the methods of the present invention either based on static deflection or on dynamic deflection, whichever embodiment of the present invention is considered most beneficial to the design of the system.

Figure 5:
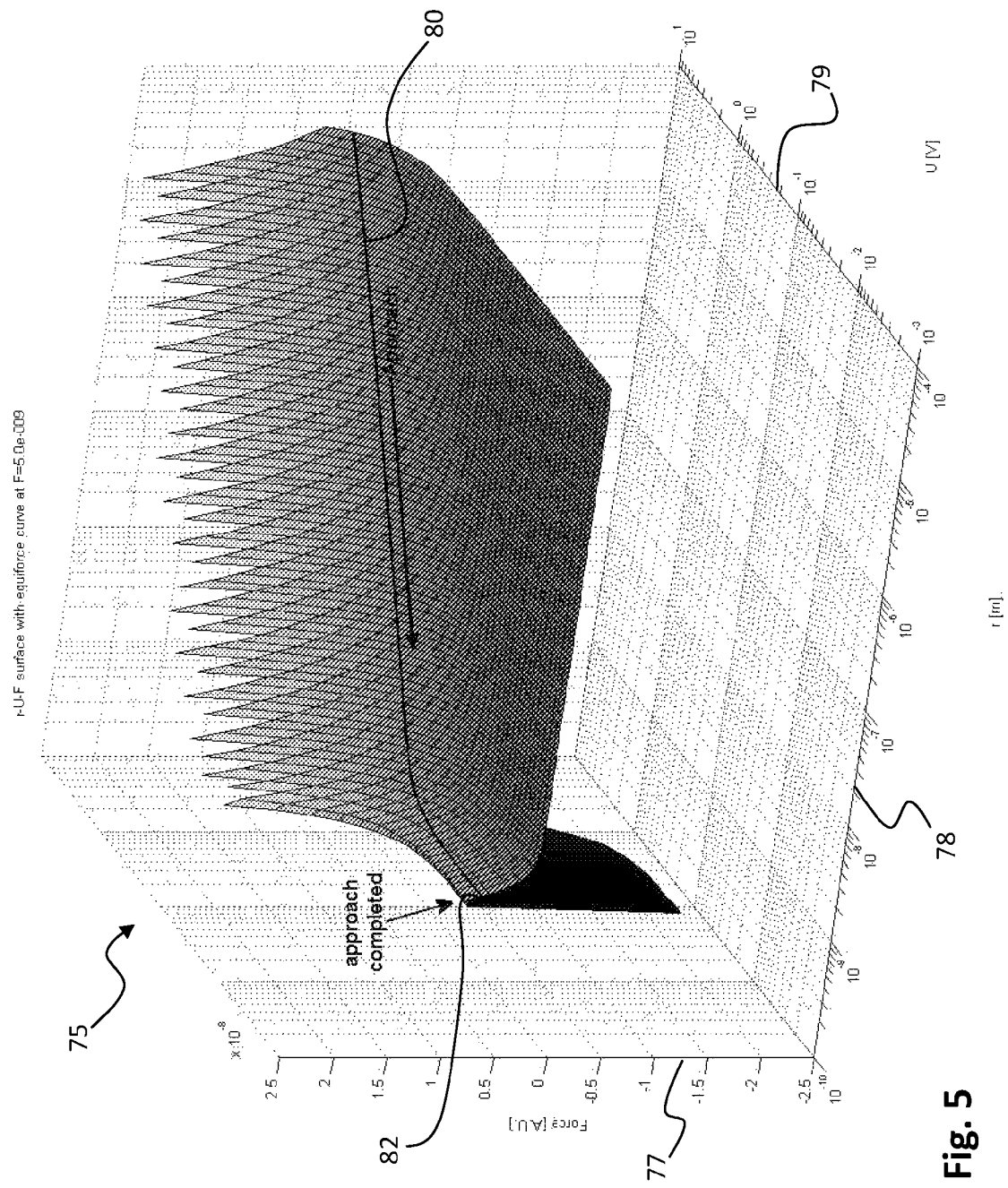
FIG. 5 is a 3D graph of the electrostatic force as a function of the voltage applied and the distance to the surface, including a path taken in accordance with the controlled approach method of the present invention.

FIG. 5 illustrates a 3D graph of the electrostatic force as a function of the voltage applied and the distance to the surface, including a path taken in accordance with the controlled approach method of the present invention. The graph 75 is a three dimensional graph illustrating the distance r to the surface on axis 78, the applied voltage U on axis 79, and on axis 77 an approximation of the resulting force F including the electrostatic force and Van der Waals force exerted on the probe. A controlled approach method in accordance with an embodiment the present invention is schematically indicated by path 80. The controlled approach takes path 80 trough the r-U-F landscape in such a manner that the electrostatic force F is kept constant. At any point along the path 80, while keeping the electrostatic force F constant by monitoring the deflection of the probe and adjusting the voltage U, the distance r to the surface is known. Adjusting the voltage effectively achieves adjustment of the electric field strength, and thereby enables to reduce the electrostatic force. By adjusting the voltage while monitoring the deflection of the cantilever, the deflection can be kept static during the approach. This can be done stepwise or as a continuous process. The approach is complete upon reaching point 82 on path 80.

In the present invention, the inventive method has been described in terms of a number of method steps and optional method steps. The steps of the method may in accordance with some embodiments be performed simultaneously in a continuous manner. Alternatively, one or more steps may be performed sequentially, without departing from the inventive concept.

The present invention has been described in terms of some specific embodiments thereof. It will be appreciated that the embodiments shown in the drawings and described herein are intended for illustrated purposes only and are not by any manner or means intended to be restrictive on the invention. The context of the invention discussed here is merely restricted by the scope of the appended claims.

The invention claimed is:

1. A method of advancing a probe tip of a probe of a scanning microscopy device towards a sample surface, the device comprising the probe for scanning the sample surface for mapping nanostructures on the sample surface, wherein the probe tip of the probe is mounted on a cantilever arranged for bringing the probe tip in contact with the sample surface, the method comprising:
controlling, by a controller, an actuator system of the device for moving the probe to the sample surface;
receiving, by the controller, a sensor signal indicative of at least one operational parameter of the probe for providing feedback to perform said controlling;
wherein the method further comprises:
maintaining, during said controlling, an electric field between the sample surface and the probe tip; and
evaluating the sensor signal indicative of the at least one operational parameter for determining an influence on said probe by said electric field, for determining proximity of the sample surface relative to the probe tip; and
wherein said step of evaluating further comprises comparing the sensor signal with a reference value and controlling said actuator system dependent on said comparison, further comprising a step of adjusting an electric field strength of the electric field dependent on said step of evaluating while the probe tip advances the substrate surface.

2. The method according to claim 1, wherein the step of maintaining an electric field comprises maintaining a bias voltage difference V between the sample surface and the probe tip.

3. The method according to claim 1, wherein the sensor signal comprises at least one of a group comprising: a probe tip deflection signal indicative of a deflection w of the probe tip from a reference position $a_0$; quality factor, damping, phase lag, phase, curvature measurement, interference, piezoresistivity, wavelength change of a ring resonator or waveguide integrated in the cantilever, and capacitive changes.

4. The method according to claim 3, wherein the step of maintaining an electric field comprises maintaining a bias voltage difference $V_0$ between the sample surface and the probe tip, and wherein the sensor signal comprises the probe tip deflection signal, and wherein the step of evaluating comprises comparing the deflection w of the probe tip with a calculated deflection $w_c$.

5. The method according to claim 4, wherein the calculated deflection $w_c$ is obtained by solving and/or estimating a differential equation:

$$C\left(\frac{\partial^4 w}{\partial x^4}\right) = -\frac{V_0^2}{2(a_0 - w)^2}$$

wherein C is a constant, said constant C including at least one or more properties of the probe.

6. The method according to claim 1, wherein the step of controlling further comprises:
controlling, by the controller during said moving of the probe, the actuator system for applying an oscillator motion to the probe tip such as to oscillate the probe tip in a direction transverse to the sample surface; and
wherein the sensor signal is at least indicative of a parameter of said oscillator motion.

7. The method according to claim 6, wherein the sensor signal comprises at least one of a group comprising: a probe amplitude signal, quality factor, damping, phase lag, phase, curvature measurement, interference, piezoresistivity, wavelength change of a ring resonator or waveguide integrated in the cantilever, and capacitive changes.

8. The method according to claim 6, wherein the step of evaluating comprises determining said parameter of the oscillating motion from the sensor signal and comparing the determined parameter with a reference value for determining a deviation from the reference value.

9. The method according to claim 8, wherein the method comprises, upon determining said deviation, reducing said bias voltage such as to diminish the deviation, and repeating the steps of controlling of the actuator system and receiving and evaluating of the sensor signal.

10. The method according to claim 9, wherein the steps of reducing the bias voltage, controlling the actuator system, and receiving and evaluating the sensor signal are repeated until the bias voltage is reduced to zero.

11. The method of operating a scanning microscopy device for scanning of the sample surface for mapping of the nanostructures thereon, the method comprising a method of advancing a probe tip of a probe towards a sample surface in accordance with claim 1.

12. A scanning microscopy device for mapping nanostructures on a sample surface of a sample, comprising at least one probe for scanning the sample surface, and an actuator system for moving the probe to and from the sample for approaching the sample surface, wherein the probe comprises a probe tip mounted on a cantilever arranged for bringing the probe tip in contact with the sample surface for enabling the scanning of the sample surface, the device further comprising:
- a controller for controlling the actuator system of the device for moving the probe to the sample surface, said controller comprising input means communicatively connected to a sensor for receiving a sensor signal indicative of at least one operational parameter of the probe for providing feedback to perform said controlling; and
- one or more electrodes for establishing and maintaining an electric field between the sample surface and the probe tip;
- wherein the controller is further arranged for evaluating the sensor signal indicative of the at least one operational parameter for determining an influence on said probe by said electric field, for determining proximity of the sample surface relative to the probe tip;
- the controller being arranged for performing said evaluating by comparing the sensor signal with a reference value and controlling said actuator system dependent on said comparison; and
- wherein the controller is further arranged for adjusting an electric field strength of the electric field dependent on said step of evaluating while the probe tip advances the substrate surface.

13. The scanning microscopy device according to claim 12, wherein the actuator system further comprises an oscillator stage, and wherein the controller is arranged for controlling, during moving of the probe towards the sample surface, the oscillator stage of the actuator system for applying an oscillator motion to the probe tip such as to oscillate the probe tip in a direction transverse to the sample surface, and wherein the sensor is arranged for providing a sensor signal which is at least indicative of a parameter of the oscillator motion of the probe; and
- wherein the controller is arranged for determining said parameter of the oscillating motion from the sensor signal and comparing the determined parameter with a reference value for determining a deviation from the reference value, and wherein the controller is arranged for, upon determining said deviation, reducing said bias voltage such as to diminish the deviation, and repeating the steps of controlling of the actuator system and receiving and evaluating of the sensor signal.

14. A computer program product, wherein said computer program product, when running on a scanning microscopy device comprising at least one probe for scanning the sample surface, and an actuator system for moving the probe to and from the sample for approaching the sample surface, wherein the probe comprises a probe tip mounted on a cantilever arranged for bringing the probe tip in contact with the sample surface for enabling the scanning of the sample surface, is capable of operating the scanning microscopy device for advancing the probe tip towards the sample surface in accordance with the method of claim 1.

15. The method of operating a scanning microscopy device for scanning of the sample surface for mapping of the nanostructures thereon, the method comprising a method of advancing a probe tip of a probe towards a sample surface in accordance with claim 6.

16. The method of operating a scanning microscopy device for scanning of the sample surface for mapping of the nanostructures thereon, the method comprising a method of advancing a probe tip of a probe towards a sample surface in accordance with claim 8.

17. The method of operating a scanning microscopy device for scanning of the sample surface for mapping of the nanostructures thereon, the method comprising a method of advancing a probe tip of a probe towards a sample surface in accordance with claim 9.

18. A computer program product, wherein said computer program product, when running on a scanning microscopy device comprising at least one probe for scanning the sample surface, and an actuator system for moving the probe to and from the sample for approaching the sample surface, wherein the probe comprises a probe tip mounted on a cantilever arranged for bringing the probe tip in contact with the sample surface for enabling the scanning of the sample surface, is capable of operating the scanning microscopy device for advancing the probe tip towards the sample surface in accordance with the method of claim 6.

19. A computer program product, wherein said computer program product, when running on a scanning microscopy device comprising at least one probe for scanning the sample surface, and an actuator system for moving the probe to and from the sample for approaching the sample surface, wherein the probe comprises a probe tip mounted on a cantilever arranged for bringing the probe tip in contact with the sample surface for enabling the scanning of the sample surface, is capable of operating the scanning microscopy device for advancing the probe tip towards the sample surface in accordance with the method of claim 8.

20. A computer program product, wherein said computer program product, when running on a scanning microscopy device comprising at least one probe for scanning the sample surface, and an actuator system for moving the probe to and from the sample for approaching the sample surface, wherein the probe comprises a probe tip mounted on a cantilever arranged for bringing the probe tip in contact with the sample surface for enabling the scanning of the sample surface, is capable of operating the scanning microscopy device for advancing the probe tip towards the sample surface in accordance with the method of claim 9.

* * * * *